Nov. 8, 1932.     G. H. HORNE ET AL     1,886,548
MEANS FOR TREATING GASES
Filed April 22, 1929     4 Sheets-Sheet 1
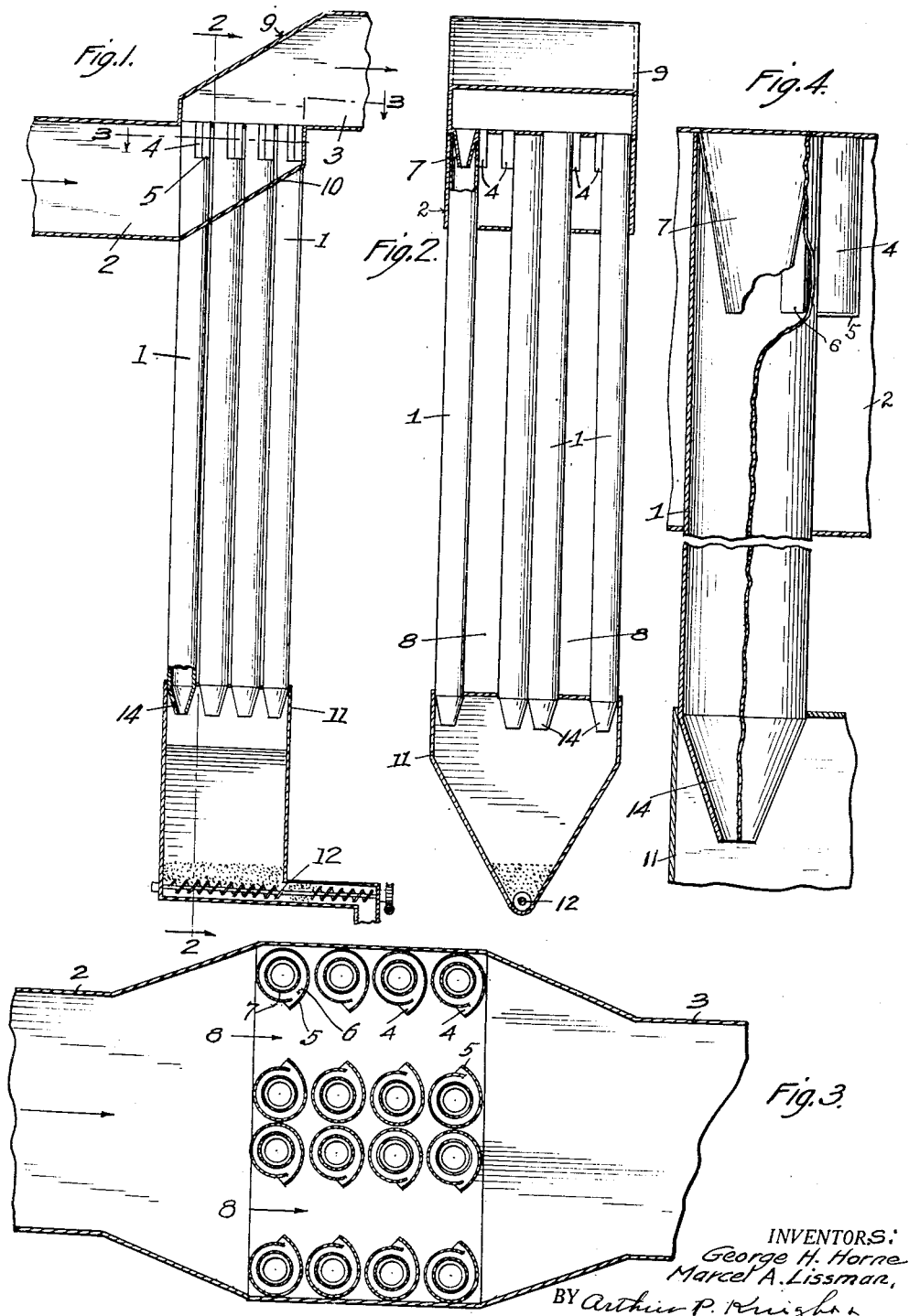
INVENTORS:
George H. Horne,
Marcel A. Lissman,
BY Arthur P. Knight
Alfred W. Knight
ATTORNEYS.

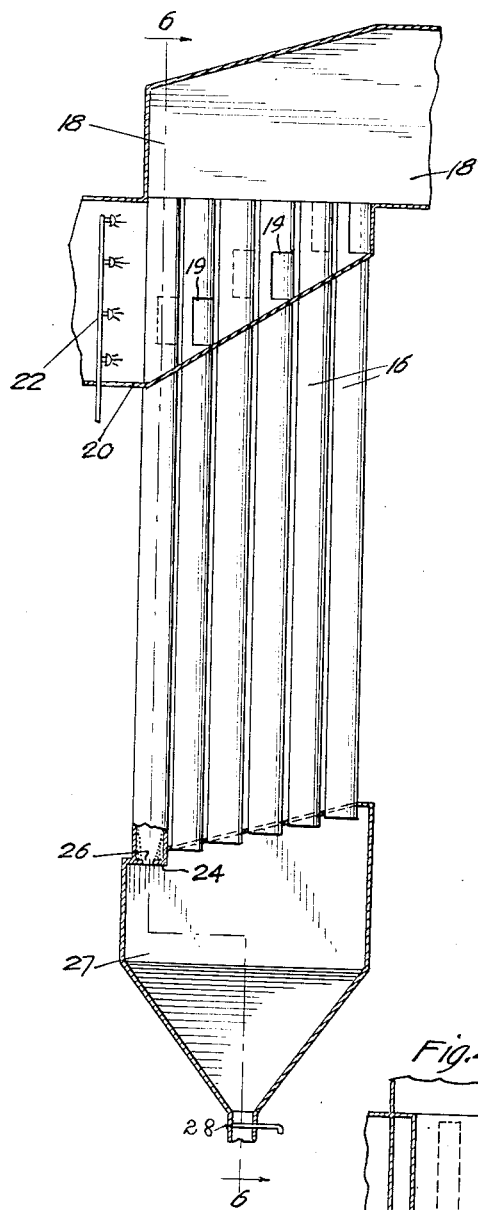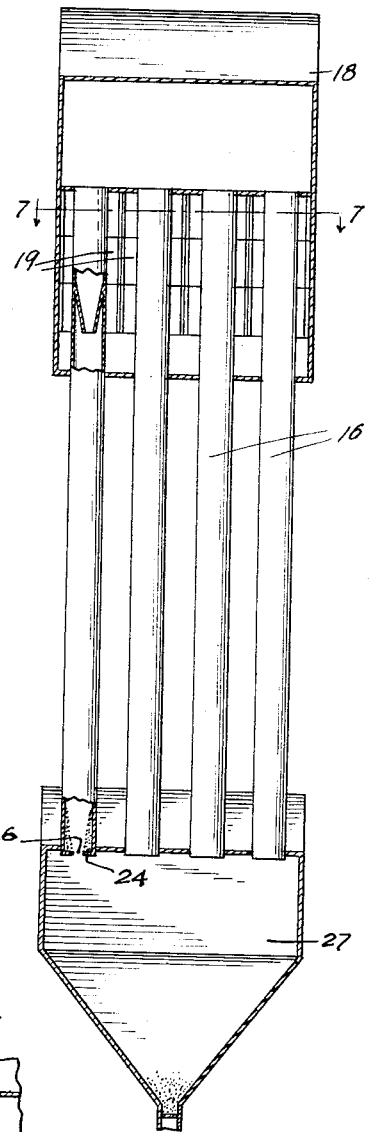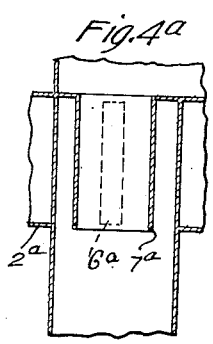

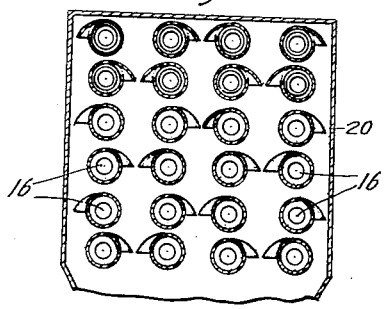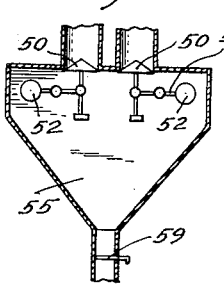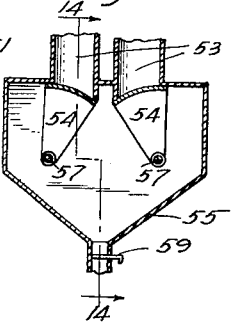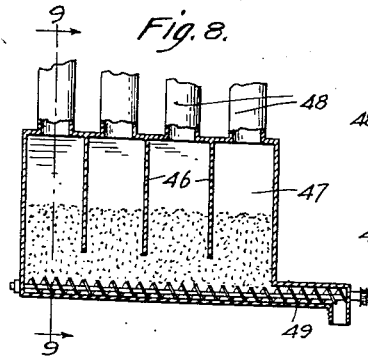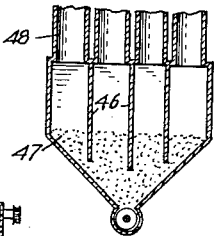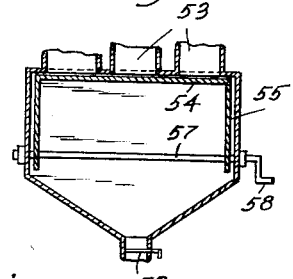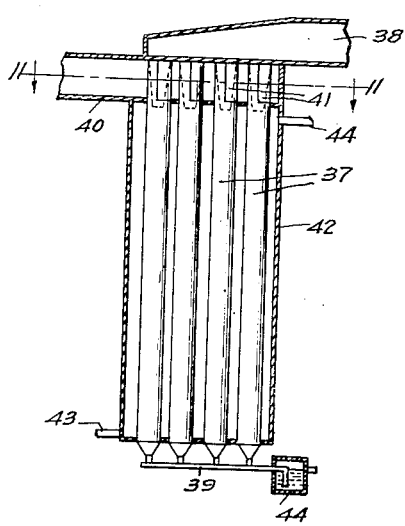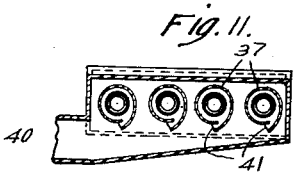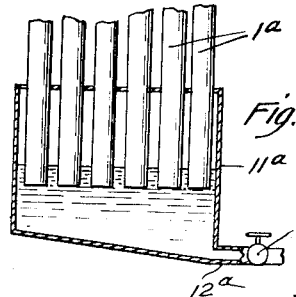

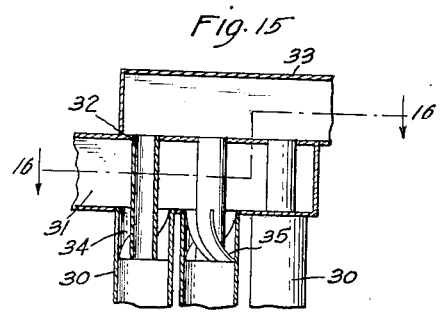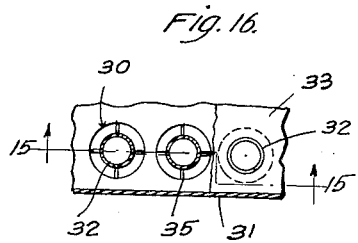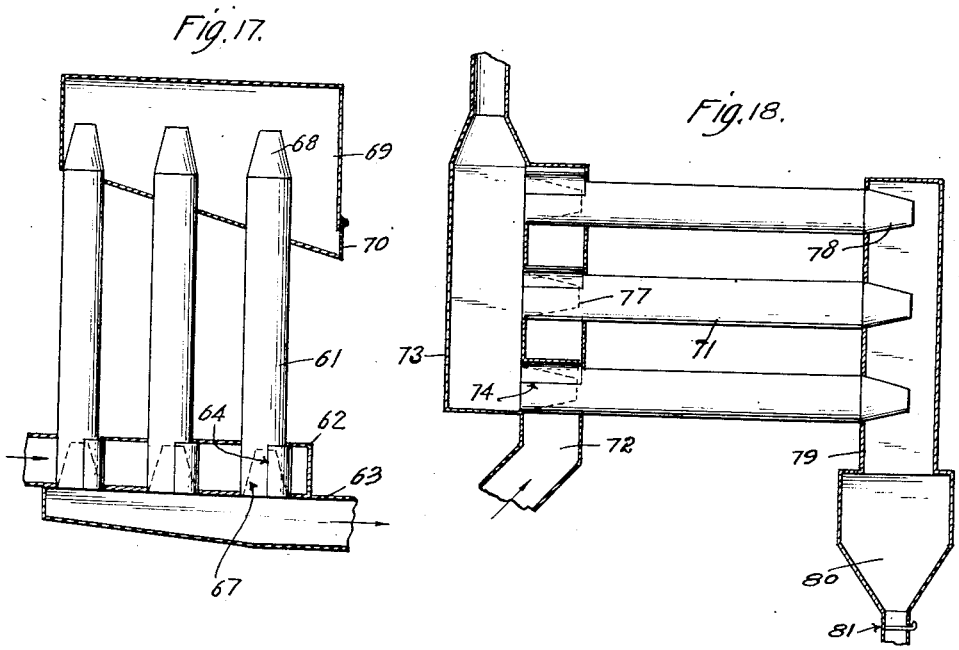

Patented Nov. 8, 1932

1,886,548

UNITED STATES PATENT OFFICE

GEORGE H. HORNE, OF GLENDALE, AND MARCEL A. LISSMAN, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA

MEANS FOR TREATING GASES

Application filed April 22, 1929. Serial No. 356,921.

This invention relates to means for treating gases, or vapors for the purpose of removing suspended material therefrom. An important object of the invention is to provide apparatus for separating suspended material from gases by centrifugal action, which will provide for high efficiency and at the same time provide for maximum economy in installation and operation.

A further important object of the invention is to provide an apparatus which can be used for cooling or for performing heat interchanging operation upon gases with maximum efficiency and economy, and to also provide for removal of suspended material, concurrently with such cooling or heat interchanging.

The accompanying drawings illustrate embodiments of our invention and referring thereto:

Fig. 1 is a vertical section of one form of our invention.

Fig. 2 is a section on line 2—2 in Fig. 1.

Fig. 3 is a section on line 3—3 in Fig. 1.

Fig. 4 is a detail section, partly in elevation of one of the tubular units of the apparatus.

Fig. 4a is a section of a modification.

Fig. 5 is a vertical section of another form of the invention.

Fig. 6 is a section on line 6—6 in Fig. 5.

Fig. 7 is a section on line 7—7 in Fig. 6.

Figs. 7a and 8 are vertical sections of modified forms of bin for receiving separated material.

Fig. 9 is a section on line 9—9 in Fig. 8.

Fig. 10 is a vertical section of a combined cooling, condensing and separating apparatus embodying our invention.

Fig. 11 is a section on line 11—11 in Fig. 10.

Figs. 12 and 13 are vertical sections of other forms of receiving means for the separated material.

Fig. 14 is a section on line 14—14 in Fig. 13.

Fig. 15 is a vertical section on line 15—15 in Fig. 16 of an apparatus embodying a modified form of inlet means for the gas to be treated.

Fig. 16 is a section on line 16—16 in Fig. 15.

Figs. 17 and 18 are vertical sections of modifications.

The form of our invention shown in Figs. 1 to 4 comprises a plurality of pipes or tubes 1, preferably extending vertically and the upper ends of said pipes or tubes extending through an inlet header 2 and opening into an outlet header or flue 3. These pipes or tubes may be arranged in rows longitudinally and/or transversely of the flues or headers, it being desirable in some cases to provide a multiplicity of such pipes or tubes in relatively small space. Each tube 1 is provided near its upper end with an inlet opening or passage 4 and with a deflector 5 spaced from the peripheral wall of the tube and extending in a curve tangential to such wall, an opening 6 being provided in the wall of the tube to permit entry of the gas passing from inlet 4 between the deflector 5 and the wall of the tube into the interior of the tube. At that portion of the tube, which is provided with the gas inlet aforesaid, is arranged a frusto-conical deflector 7 as shown in Fig. 2 whose longitudinal or vertical extension corresponds to, or is somewhat greater than, the vertical extension of the inlet opening 4. The inlet opening between deflector 5 and the wall of the tube is tangential with respect to the tube, so that the gas enters the tube tangentially. The opening or passage within conical deflector 7 constitutes a gas outlet opening communicating with the outlet header and through which clean gas may pass from the interior of the separator tube to the outlet header. The outlet header is contiguous or immediately adjacent to the inlet header, and separated therefrom by a partition which forms the bottom of the outlet header and the top of the inlet header.

At their lower ends, the tubes or pipes 1 open into a material-receiving chamber or bin 11 which may be provided with any suitable means, such as a delivery conveyor 12 for discharging the separated material therefrom either continuously or intermittently. We have found it desirable to constrict the lower end of each tube or pipe 1 where it enters the material-receiving bin 11, this constriction being effected, for example, by means of a frusto-conical member 14 at the lower end of each tube or pipe. The opening at the bottom of member 14 may be about one fourth the diameter of tube 1. As shown in Fig. 3, the respective rows of tubes 1 may be spaced so as to form channels 8 through which the gases may pass from the inlet flue 2 to the inlet openings 4 of the respective tubes 1. In order to provide for uniform flow of the gas, the inlet and outlet flues may be provided with inclined deflector walls 9 and 10 so as to equalize the velocity of the gas stream as far as is practical so as to insure substantially uniform delivery of gas to the respective tubes. For this purpose the deflector wall 10 of the inlet header is inclined toward the inlet means 4 with reference to the direction of flow of the gas stream, and the deflector wall 9 of the outlet header is inclined outwardly from the gas outlets within the cones 7 with reference to the direction of flow of the gas stream.

The apparatus above described is advantageously used for the purpose of separating suspended material from gases and at the same time cooling the gas. However, it presents special advantages in the separation of suspended material independently of any cooling or heat-interchanging operation and will be described primarily in connection with its use as a separator.

The gases to be cleaned are delivered through the inlet flue or header 2 and are deflected by means 5 through the openings 4 and 6 into the respective tubes 1 preferably at or near the upper ends of the said tubes. The position of the openings 4 and 6 and of the deflector 5 causes the gas so entering to pass tangentially into the tube and a sufficient head or pressure difference is maintained between the gas inlet flue 2 and the outlet flue 3 to insure that the gas stream entering the tube tangentially in this manner will do so at sufficiently high velocity to establish a vortex column within the tube. The stream of gas entering the tube first passes circumferentially in the space between cone 7 and the wall of the tube and at the same time is given a downward component of velocity causing it to pass in a helical path downwardly along the tube and the rotary and vertical components of motion are subject to gradual variation along the tubes, in such manner that in the lowermost portion of the tube the gas is relatively quiescent, as regards the vertical component.

To maintain the quiet zone it is necessary that the bin or receiving means 11 shall be closed against egress or ingress of air or gas. The conveyor or discharging means 12 is constructed and operated in such manner as to maintain such closure. When a plurality of tube separator units are provided as shown in Figs. 1 and 2, opening into a single receiving means or bin, it is necessary to also provide means for controlling communication between the several tubes and the bin to prevent circulation of gas between the tubes through said bin. This may be effected by constriction of the lower end of each tube 1 by means of the frusto-conical outlet member 14 or it may be effected by other means as hereinafter set forth.

In case the gas passing to the apparatus is hot, the apparatus above described also operates as an efficient cooling means on account of the extended surface of the tubes and of the rapid motion of the gases in contact with the tubes which conduces to effective heat transfer by eliminating the heat insulating layer or film of quiescent gas directly adjacent the tube wall. The fact that the rapid motion also tends to prevent or remove any deposit of solid material on the tube wall also conduces to the heat transfer, as such a deposit tends to retard the passage of heat.

The deflector means 7 is not necessarily frusto-conical as it may be formed as a cylindrical tube as shown at 7a in Fig. 4a mounted on and depending from the top of the inlet header 2a. Either the cone or cylinder form of the tubular deflector forms a tubular outlet passage for the gas which is separated from the tangential inlet opening 6a by the tubular deflector means 7a, thereby forcing the gas to pass downwardly into the tube as it enters the same.

The above described construction involving the use of a multiplicity of separator tubes is of special advantage in connection with the type of separator tube disclosed in our application filed March 26, 1929, Serial No. 349,947, namely, a separator tube of relatively small diameter and relatively great height, for the reason that in connection with such a tube construction the provision of a multiplicity of tubes enables us to obtain the efficiency resulting from such tube constructions and at the same time provide for a large gas treating capacity. The construction involving a separator tube of great height and relatively small diameter is also of special advantage in connection with a multiplicity of tubes opening into a common dust receiving chamber for the reason that with such a tube construction the turbulence or gas movement is reduced to a minimum at the bottom of the tubes thereby minimizing the tendency to circulation between the tubes and the dust-receiving chamber and correspondingly increasing the efficiency of separation. To obtain the special advantages due to use of the form of tube separator units described in our application aforesaid, the tubes 1 are preferably made of a vertical height at least six times the diameter of the tubes. We do not desire, however, to limit our invention to the use of such a special construction of separator tube, since the use of a multiplicity of separator tubes having communication with a common inlet and a common outlet and discharging to a single dust-receiving chamber may be used advantageously in connection with separator tubes of any suitable diameter and height, provided the length is sufficient to properly reduce the movement of the gas at the point of material discharge, so as to enable the construction to be operative in preventing circulation.

In the construction shown in Figs. 5, 6 and 7, the separator tubes indicated at 16 open at their upper ends into an outlet header or flue 18, and are provided near their upper ends with tangential inlet passages 19, communicating with inlet flue 20, these inlet passages being similar to the inlet passages of the tubes shown in Fig. 1, but disposed as shown so that their inlet passages 19 are at progressively higher levels in the case of tubes further along the gas stream, so that the gas is distributed uniformly to all the inlet passages.

In some cases it is desirable to spray or otherwise supply water or other liquid into the gases being treated in the above described apparatus, and Fig. 5 shows suitable spray means 22 for this purpose. In this case, the water or liquid particles or mist resulting from such spray will be forced to the wall of the tube along with the solid material and may materially assist in the separating action by carrying with them particles of fume or solid material too minute for effective separation by direct centrifugal action. The water which is brought into contact with the tube wall by the centrifugal action continually washes down the deposited material to the bottom of the tube. In these figures, constriction at the bottom of the tubes is provided for by a plate 24 at the bottom of each tube, with an opening 26 of a size corresponding to the opening of the frusto-conical member at the bottom of the tubes shown in Figs. 1 and 2. The deposited material, either finely divided solid material or a mixture of such solid material and liquid, passes through these openings to the receiving chamber 27. This chamber may be provided with any suitable means for discharging the collected material while maintaining closure against communicaton with the outer air. In case the apparatus is used in connection with liquid-supply means, such as the spray devices 22, and the resulting collected material is in liquid or fluent condition, the chamber 27 may have a valved outlet 28 which is so controlled as to permit continual or intermittent discharge of the material from the chamber while always maintaining a sufficient amount thereof in the chamber to act as a seal.

Our invention is also applicable to the separation of acid mist or other liquid particles from a body or stream of gas or vapor and the apparatus shown in Figs. 5 and 6 is suitable for that purpose. It will be understood that in the case of treatment of gases bearing acid mist, such as sulphuric acid mist occurring in sulphuric acid manufacturing at recovery plant, the apparatus will be constructed of, or lined with suitable acid-resistant material. The separator tubes are preferably substantially cylindrical, but may taper toward the top or toward the bottom, to some extent, if desired.

In case the apparatus is used for separation or collection of liquid material as above stated, it may be advantageous in some cases to seal the lower ends of the separator tubes or units by constructing the same as shown in Fig. 7a, the tubes 1a in that case projecting downwardly into the material-receiving chamber 11a which is provided with an outlet pipe 12a suitably controlled by means of a valve 28a as shown to retain a body of liquid as indicated within said chamber so as to submerge and seal the lower ends of the separator tubes thereby preventing communication or circulation between the respective tubes.

As shown in Figs. 15 and 16, the separator tubes indicated at 30 may open at their upper ends directly into the inlet header 31, outlet tubes or passages 32 being provided extending downwardly from the outlet header 33 directly above the inlet header to within the separator tubes 30 so as to form annular inlet passages 34 between the parts 30 and 32, helical or spiral vanes 35 being mounted in said passages 34 to deflect the gas tangentially into the separator tubes with the result that the gas is caused to move in the separator tubes with tangential and vertical components in the same manner as above described.

Our invention may be advantageously applied as a means for cooling, condensing and separating constituents of gases or vapors. For this purpose the apparatus shown in Figs. 5 and 6 may be utilized, in case air cooling is sufficient. When a more definite condensing action is desired, we may use the construction illustrated in Figs. 10 and 11, the condenser and separator tubes 37 being connected at their upper ends to an outlet flue 38 and at their lower ends to a discharge pipe 39 for condensed liquid, and the inlet flue 40, for the gases or vapors to be treated, extending around the upper portions of tubes 37 and communicating therewith through tangential inlets 41. A casing 42 surrounds the tubes 37 below the inlet portion thereof and is supplied with cooling fluid, for example water, at a definite temperature, through pipe 43, the waste water being drawn off at 44. Gas or vapor-bearing condensible constituents is supplied to the inlet flue and passes through the apparatus at a suitable pressure head to cause it to enter the tubes 37 at high velocity and to establish a vortex column with a downward component next to the wall of the tube and an upward component in the axial portion of the tube, as above explained, and in this operation, the rapid motion of the gas or vapor in contact with the wall of the tube ensures effective heat transfer through the tube wall to the cooling medium around the tube, with corresponding efficient condensation of the condensible constituent thereof, and such constituent, when liquefied, is immediately subject to the separating action above described and, descending in the tube, is eventually drawn off through pipe 39. The gas or vapor from which the condensible constituent has been received is discharged eventually through the upper ends of the tubes 37 to the outlet flue 38.

Any suitable means may be provided for preventing communication between the material-receiving chamber or bin, and the outer air and between the lower ends of the respective tubes. For example, as shown in Figs. 8 and 9, partitions 46 may be provided in the material-receiving chamber 47 between the respective separator tubes 48 dividing the space within said chamber into a plurality of compartments corresponding to and communicating with the respective tubes. These partitions terminate sufficiently above the bottom of chamber 47 to permit the separated material to gravitate to a common outlet provided with suitable discharge means, for example, a screw conveyor 49, which is operated in such manner as to always maintain sufficient separated material in chamber 47 to extend above the lower edges of said partition and thereby form a seal.

Another means for preventing communication between the lower ends of the separator tubes is shown in Fig. 12, a closure 50 being provided for the bottom of each tube, such closure being carried by a lever 51 having a counter-weight 52 tending to hold the closure means 50 in position to close the tube, but permitting the closure means to open under the weight of material collecting in the tube to gradually or intermittently discharge the collected material. Or, as shown in Figs. 13 and 14, the lower ends of the separator tubes indicated at 53 may be normally closed by gates 54 pivotally mounted on shaft 57 in the material-receiving chamber 55 and operated by levers 58 on said shafts and located outside of the chamber so as to momentarily open the lower end of the tube and immediately close the same. Discharge gates 59 may be provided at the bottom of the receiving chamber 55.

By providing a plurality of separator tubes, connected in multiple relation, we are able to obtain effective separation of suspended material from a large volume of gas in a limited time while at the same time obtaining the efficiency of separation resulting from centrifugal action in separator tubes of relatively small diameter. With such a construction it is desirable to provide for preventing or minimizing circulation between the several pipes through the bin, or material-receiving chamber, as such circulation would tend to produce upward currents in some of the separator tubes, which would prevent effective collection of the suspended material. For this purpose we prefer to provide the construction, as described, at the lower ends of the tubes, as such construction involves minimum expenses in installation and operation, but other means for preventing such circulation may be used as above described.

While we prefer to provide means for constricting or closing off communication between the lower ends of the tube in the case of a multiple tube separator so as to ensure maximum dust or fume collection by preventing circulation currents between the several tubes and the bin, we do not desire to limit our invention to such construction. In any case, however, it is desirable to maintain closure of the material-receiving chamber so as to prevent communication between the same and the outside air.

A desirable feature of the described construction is the compact arrangement of the flues and separator units, one of said flues being located directly above the other and the separator extending through the inlet flue and opening into the outlet flue, and having inlets all opening into the inlet flue.

While we have described our invention as applied in connection with vertically extending tubes in which the gas inlet and outlet are at the top of the separator tubes, it will be understood that this arrangement is not necessarily adhered to. Thus as shown in Fig. 17, the apparatus may comprise vertically extending separator tubes 61 connected at their lower ends to the gas outlet flue or header 63 and connected through tangential inlets 64 at their lower end portions with the gas inlet flue or header 62, the upper ends of the separator tubes opening into a collecting bin or material-receiving means 69. Tubular deflector means 67 are provided as indicated at the lower ends of the tubes in this case and constricting means 68 are provided at the upper ends of said tubes. The material-receiving means 69 is provided with an inclined floor and with a discharge gate 70 at the lower end thereof. It will be understood, however, that any suitable means may be provided for removing the collected material from the receiving means 69. The operation of this form of the invention is similar to that above described with the exception that the vertical component of motion within the separator tube is upward instead of downward, the velocity imparted to the gases in this case being sufficient to raise all of the suspended material to the top of the separator tubes and discharge same into the means 69.

The separator tubes may, instead of being vertical extend at any desired angle to the vertical. Thus, as shown in Fig. 18, the separator tubes 71 may extend horizontally from the outlet header 63, the outlet header 73 and inlet header 72 being in this case vertical and extending side by side and the inlet header 72 surrounding the separator tubes 71 and communicating therewith through tangential inlet means 74 the other ends of the separator tubes communicating through constricting means 78 with a chamber 79 for receiving the separated material and conducting same to a bin 80 provided with a discharge gate 81. The operation of this form of the invention is similar to that above described except that the longitudinal component of motion within the separator tubes is horizontal.

In this case as in the cases above described, all of the separator tubes are connected at one end to the gas inlet and outlet flues or headers and comunicate at their other end with a chamber constituting a means for receiving separated material. Moreover, the inlet and outlet flues or headers extend adjacent one another, the separator tubes opening into the outlet flue or header and the inlet flue or header surrounding the tubes and communicating therewith through tangential openings.

It will be understood that the forces developed by the pressure head in the apparatus and by the centrifugal action are much greater than forces due to the action of gravity on the suspended particles, so that the apparatus will operate effectively irrespective of the angular position of the separtor tubes with respect to the vertical. In general, however, it is desirable to arrange the tubes, for example, as shown in Figs. 1 to 16, so that the action of gravity will facilitate the discharge of the separated material into the material-receiving chamber.

It is generally desirable to provide for carrying away the cleaned gases and our invention is of especial advantage in that connection as providing a compact arrangement of inlet and outlet headers or flues. In case it is not expedient or desirable to carry away the cleaned gases, the outlet header or flue above described may be omitted and the outlet passages of the separator tubes may open directly to the atmosphere.

We claim:

1. Means for separating suspended material from gases comprising a gas inlet header, a plurality of vertically extending separator tubes each provided at its upper portion with an inlet opening communicating with the inlet header and with means for directing the gas from the inlet header through said opening tangentially into the tube, a tubular deflector extending within each separator tube and forming an outlet passage for the gas, said tubular deflector separating said inlet opening from said outlet passage, a material-receiving bin communicating with the lower end of all of said separator tubes to receive and accumulate separated material and means for controlling communication between the respective separator tubes and the material receiving bin to prevent circulation of gas between the tubes through said bin.

2. Means for separating suspended material from gases, comprising a gas inlet header, a plurality of parallel separator tubes each provided at one end with an inlet opening communicating with said inlet header and with means for directing gas from said inlet header through said opening tangentially into the separator tube, a tubular deflector extending within each separator tube and forming an outlet passage for the gas, said tubular deflector separating said inlet opening from said outlet passage, a material receiving bin communicating with the lower end of all the separator tubes to receive and accumulate separated material therefrom, and constricting means providing a central opening at the bottom of each tube of less diameter than the tube for controlling communication between the respective tubes and the bin, to prevent circulation of gas between the tubes through the bin, each of said tubes being elongated relative to its diameter so as to cause reduction of movement of gas adjacent said central opening sufficiently to enable said constricting means to be operative in preventing said circulation, said bin being unobstructed between said central openings and the lower ends of said tubes extending through a wall of said bin with said central openings adjacent said wall.

3. A construction as set forth in claim 2, in which said constricting means consists of tapering tubular members at the ends of the respective tubes.

4. Means for treating gases for the purposes set forth, comprising a gas inlet header, a plurality of separator tubes extending downwardly from said header and having inlet means for directing gas tangentially from said inlet header into said tubes, tubular deflectors extending within the respective separator tubes at the upper ends thereof and forming outlets for the gas, a material receiving chamber at the lower ends of the respective separator tubes, said separator tubes having constricted openings at their lower ends, communicating with said material receiving chambers and means for supplying liquid to the inlet portion of each separator tube.

5. A construction as set forth in claim 4, in which said liquid supply means comprises spray means for spraying liquid into the inlet header.

6. Means for separating suspended material from gases comprising a plurality of tubular separator members arranged in a row, each tubular separator member being provided with gas inlet means at one end for directing gas tangentially thereinto, a central gas outlet means adjacent said gas inlet means, and an outlet for separated material at the other end of the tubular separator member, and an inlet header extending along the row of tubular separator members adjacent the gas inlet means thereof and communicating with the gas inlet means of all the tubular separator members, said header having a deflector wall inclined inwardly toward said gas inlet means with reference to the direction of flow of the gas therein, so as to substantially equalize the velocity of the gas stream and maintain substantially uniform delivery of gas to the respective tubular separator members.

7. Means for separating suspended material from gases comprising a plurality of tubular separator members arranged in a row, each tubular separator member being provided with gas inlet means at one end for directing gas tangentially thereinto, a central gas outlet means adjacent said gas inlet means, and an outlet for separated material at the other end of the tubular separator member, and an outlet header extending along the row of tubular separator members adjacent the gas outlet means thereof and communicating with the gas outlet means of all the tubular separator members, said header having a deflector wall inclined outwardly from said gas outlet means with reference to the direction of flow of the gas therein, so as to substantially equalize the velocity of the gas stream and maintain substantially uniform outflow of gas from the respective tubular separator members.

8. Means for separating suspended material from gases comprising a plurality of tubular separator members arranged in a row, each tubular separator member being provided with gas inlet means at one end for directing gas tangentially thereinto, a central gas outlet means adjacent said gas inlet means, and an outlet for separated material at the other end of the tubular separator member, an inlet header extending along the row of tubular separator members adjacent the gas inlet means thereof and communicating with the gas inlet means of all the tubular separator members, said header having a deflector wall inclined inwardly toward said gas inlet means with reference to the direction of flow of the gas therein, and an outlet header extending along the row of tubular separator members adjacent the inlet header and adjacent the gas outlet means and communicating with the gas outlet means of all the tubular separator members, said header having a deflector wall inclined outwardly from the gas outlet means with reference to the direction of the gas flow, said inclined deflector walls serving to substantially equalize the velocity of the gas stream and maintain substantially uniform flow of gas into and out of respective tubular separator members.

9. Means for treating gases comprising an inlet header, an outlet header immediately adjacent to the inlet header and separated therefrom by partition means, a plurality of separator tubes connected to and extending from said partition means and opening into the outlet header and passing through the inlet header and provided with tangential openings communicating with the inlet header, tubular deflector means in each separator tube extending between said tangential openings and the openings of said tubes into the outlet header, a common material receiving chamber connected to the other ends of all of said separator tubes, and means for restricting communication between said separator tubes and said material receiving chamber.

In testimony whereof we have hereunto subscribed our names this 13th day of April, 1929.

GEORGE H. HORNE.
MARCEL A. LISSMAN.